United States Patent
Wei et al.

(10) Patent No.: US 9,042,249 B2
(45) Date of Patent: May 26, 2015

(54) METHOD AND APPARATUS FOR PROCESSING VOICE CALL

(75) Inventors: Xuesong Wei, Shenzhen (CN); Zhijun Zhou, Shenzhen (CN); Zhongliang Zhu, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 468 days.

(21) Appl. No.: 13/508,218

(22) PCT Filed: Jun. 11, 2010

(86) PCT No.: PCT/CN2010/073824
§ 371 (c)(1),
(2), (4) Date: May 4, 2012

(87) PCT Pub. No.: WO2010/145501
PCT Pub. Date: Dec. 23, 2010

(65) Prior Publication Data
US 2012/0220262 A1    Aug. 30, 2012

(30) Foreign Application Priority Data
Nov. 4, 2009    (CN) .......................... 2009 1 0209673

(51) Int. Cl.
*G01R 31/08*    (2006.01)
*G06F 11/00*    (2006.01)
*G08C 15/00*    (2006.01)
*H04Q 3/00*    (2006.01)
*H04M 15/00*    (2006.01)

(52) U.S. Cl.
CPC ..... *H04Q 3/0095* (2013.01); *H04Q 2213/1307* (2013.01); *H04Q 2213/13349* (2013.01); *H04M 15/43* (2013.01); *H04M 15/64* (2013.01); *H04M 15/8038* (2013.01)

(58) Field of Classification Search
CPC .................................................... H04Q 3/0095
USPC .......................................................... 370/252
See application file for complete search history.

(56) References Cited

U.S. PATENT DOCUMENTS 8,619,812 B2 *   12/2013   Madan et al. ................. 370/467
2006/0148470 A1 *   7/2006   Kumar et al. ............. 455/432.1

FOREIGN PATENT DOCUMENTS

| CN | 1558694 | 12/2004 |
|---|---|---|
| CN | 1866958 | 11/2006 |
| CN | 101699843 | 4/2010 |
| KR | 20080015357 | 2/2008 |

OTHER PUBLICATIONS

An International Search Report dated Sep. 23, 2010 issued in PCT/CN2010/073824.

* cited by examiner

*Primary Examiner* — Mark Rinehart
*Assistant Examiner* — Maharishi Khirodhar
(74) *Attorney, Agent, or Firm* — Diederiks & Whitelaw, PLLC

(57) ABSTRACT

A provided method for processing a voice call includes: loading CAP operation libraries and algorithms of camel1 and camel2 to a service creation environment version of camel3; identifying a network type of camel and determining whether to modify IDP parameters according to the identified network type; triggering a service of a camel3 network type; the service identifying a network type of camel, in which a current call is located, based on an event number and IDP parameters; invoking, according to the identified network type of camel in which the current call is located, a CAP operation library and an algorithm of a corresponding camel to process parameter information in an IDP, and invoking a signalling of a corresponding network type in subsequent operations. By applying the solution, it is not required to update service products to be adaptive to the network type.

11 Claims, 3 Drawing Sheets

METHOD AND APPARATUS FOR PROCESSING VOICE CALL

This application represents a National Stage application of PCT/CN2010/073824 entitled "Voice Call Processing Method and Apparatus Thereof" filed Jun. 11, 2010, pending.

FIELD OF THE INVENTION

The present invention relates to the field of the telecommunications industry, especially relating to a method and an apparatus for processing a voice call.

BACKGROUND OF THE INVENTION

A most important characteristic of an intelligent network, which is a kind of architecture applied for producing and providing services, is that various special value-added services can be provided rapidly, conveniently, flexibly and economically. Moreover, service control and charging are performed separately by an Online Charging System (OCS) which is locally or globally used by more and more operators currently.

A Pre-Paid Service (PPS) is regarded as a fundamental and the most important service content provided by each operator and the quality of a voice service directly influence profits and benefits of the operator. For a mobile network, a Customized Applications for Mobile Network Enhanced Logic (camel) protocol has been supported in most countries. However, due to different economic conditions, the phases of camel are different, some are in the camelphase1 (camel1 for short), some are in the camelphase2 (camel2 for short) and the others are in the camelphase3 (camel3 for short). Aiming at these three different network types, the voice call service should be developed using a corresponding network protocol signalling to adapt to the network types. For those operators using earlier camel phases, the network in an earlier camel phase is updated to a network in a later camel phase, according to a traditional service development process, the voice call service should also be updated and rebuilt so that the corresponding camel protocol is used thus inevitably increasing the development and maintenance costs and lowering the operation efficiency.

In addition, for some operators which determine to use higher camel types, there are also problems existing in their call services, e.g. if an operator adopts the camel3 network type and all the voice call services within the network coverage of the operator adopt signalling corresponding to camel3, however, when the voice call services roam to other countries or environments the network type of which are a camel1/camel2, the signalling required to be processed will turn into a signalling of camel1/camel2, so a roamed call cannot be processed or supported in the voice call services.

SUMMARY OF THE INVENTION

The present invention provides a solution for processing a voice call to solve at least one of the problems above.

According to one aspect of the present invention, a method for processing a voice call is provided, comprising the steps of based on a camel3, loading CAMEL Application Part (CAP) operation libraries and algorithms of a camel1 and a camel2 to a service creation environment (SCE) version of the camel3; identifying a network type of camel according to an application context of the camel, and determining whether to modify Initial Detection Point (IDP) parameters according to the identified network type; triggering a service of a camel3 network type; the service identifying a network type of camel, in which a current call is located, based on an event number and IDP parameters; invoking, according to the identified network type of the camel in which the current call is located, a CAP operation library and an algorithm of a corresponding camel to process parameter information in an IDP and invoking a signalling of a corresponding network type in subsequent operations.

According to another aspect of the present invention, an apparatus for processing a voice call is provided, comprising: a loading unit, configured to load, based on a camel3, CAP operation libraries and algorithms of a camel1 and a camel2 to an SCE version of the camel3; a modification unit, configured to identify a network type of camel according to an application context of the camel, and determine whether to modify IDP parameters according to the identified network type; a triggering unit, configured to trigger a service of a camel3 network type; an identification unit, configured for the service to identify a network type of camel, in which a current call is located, based on an event number and IDP parameters; and a processing unit, configured to invoke, according to the identified network type of the camel in which the current call is located, a CAP operation library and an algorithm of a corresponding camel to process parameter information in an IDP and invoke a signalling of a corresponding network type in subsequent operations.

By applying the present invention, the CAP operation libraries and the algorithms of camel1 and camel2 are loaded to the SCE version of camel3, and the camel type of a call is judged so that the service is not required to be updated and can directly adapt to the network type of the operator. At the same time, the service can automatically adapt to the current network environment, no matter whether the user is roaming internationally, or what network environment (camel1/2/3) the user is in, the voice call services can be processed automatically.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

Figure 1:
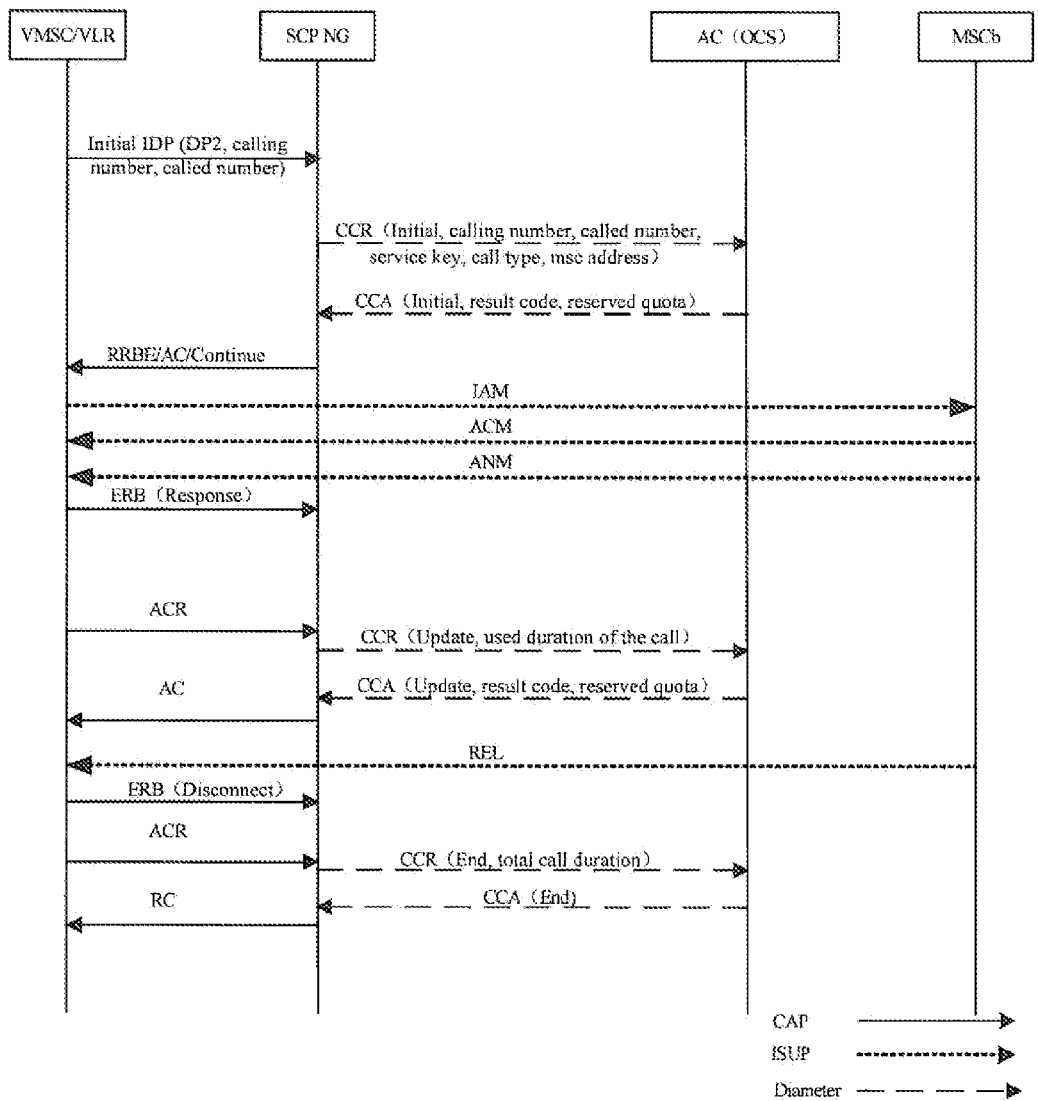
FIG. 1 is a signalling flowchart of a calling PPS of the camel2 and camel3 network types based on the charge of the OCS according to an embodiment of the present invention.

The present invention is described according to the accompanying drawings and embodiments as below in details. What needs to be explained is that, the embodiments and the characteristics in the embodiments can be combined mutually if there are no conflicts.

Embodiment 1

In this embodiment, a voice call service which is automatically adaptive to network types such as camel1/2/3 etc. based on the charge of an OCS comprises: rebuilding an intelligent network platform, a development environment and an upper application to adapt to different camel applications.

In the part of rebuilding the intelligent network platform, after identifying camel phase information by a state machine, a parameter of the IDP message of camel3 are extended, so that upper layer applications can identify the camel phase information according to the parameter. At the same time, a Service Control Point (SCP) needs to compatibly process all signalling of all these camel phases and verity the camel signalling consistency in one session. Further, the platform needs to support a service of the camel3 type in which the same service key can be triggered when users sign up for intelligent network services (with the same service key) of different camel types.

In the part of rebuilding the SCE of the intelligent network, based on the camel3 version, the extended parameter of the IDP message is supported, and the service can be notified to identify the current camel phase so that the service can select operations of the corresponding camel phase to perform subsequent processing; the CAP operation libraries of camel2 and camel1 are loaded to the SCE version of camel3 so that the service can use the operations of camel2 and camel1. At the same time, the SCE further needs to support the complete set of algorithms corresponding to the corresponding camel type.

In the part of the upper layer applications, first the camel type of the application is identified by the extended field in the IDP, then the corresponding algorithm processing is performed; the camel type should be kept consistent for the signalling processing. The service needs to analyze and compare the signalling of these three network types and separately process different parameters of the same signalling, for the camel1 network type with relatively large difference, sound reproduction is not supported because a Specialized Resource Function (SRF) and an Apply Charging (AC) are not supported. At the same time, the service automatically defines a timer according to the duration quota returned by the OCS, monitors the call, issues a CCR update to apply for the subsequent quota after the timer expires, and then performs the subsequent processing; if the quota is not obtained, the service directly delivers a Release Call (RC) message to release the call.

By virtue of this embodiment, a method for realizing a voice call service which is provided by the PPS service in the OCS and automatically adaptive to network types is applied in the intelligent network, thus facilitating the operators to develop voice services, and saving development and investment costs, and it is beneficial for the suppliers to popularize voice services.

Embodiment 2

This embodiment provides a method for processing a voice call which is automatically adaptive to camel network types, i.e. a call service which is compatible with the camel1/2/3 types is provided. In the method, the camel3 service is rebuilt, the IDP message in the camel3 service is modified and a field is extended to carry camel phase information, so as to indicate the service to perform relevant operations. If it is the camel2, the subsequent Request Report Basic Call State Model (BCSM) Event (RRBE), the AC, the continue signalling, the Event Report BCSM (ERB), the Apply Charging Report (ACR) and the RC etc. are processed by using the operations of camel2. Some special processing is performed for the camel1 type applications which do not support the SRF, the AC operations, and the sound reproduction operation. The embodiment of the present invention relates to modifications to a state machine, the SCE and the upper layer service of the PPS voice. The SCE needs to modify the IDP message to open the extended parameters in the IDE message, so as to notify the camel phase of the operation to the service. At the same time, in the camel3 version, the SCE needs to support the operations and algorithms of camel2 and camel1. The state machine is required to be modified to be able to obtain the application context of the camel from a TC-Begin message, and to be able to modify the IDP message parameter to which carries camel phase to the SLP. The upper layer applications are required to accurately identify the network type of the camel, and perform the corresponding operations, especially perform special processing for the camel1 network type.

Embodiment 3

Figure 2:
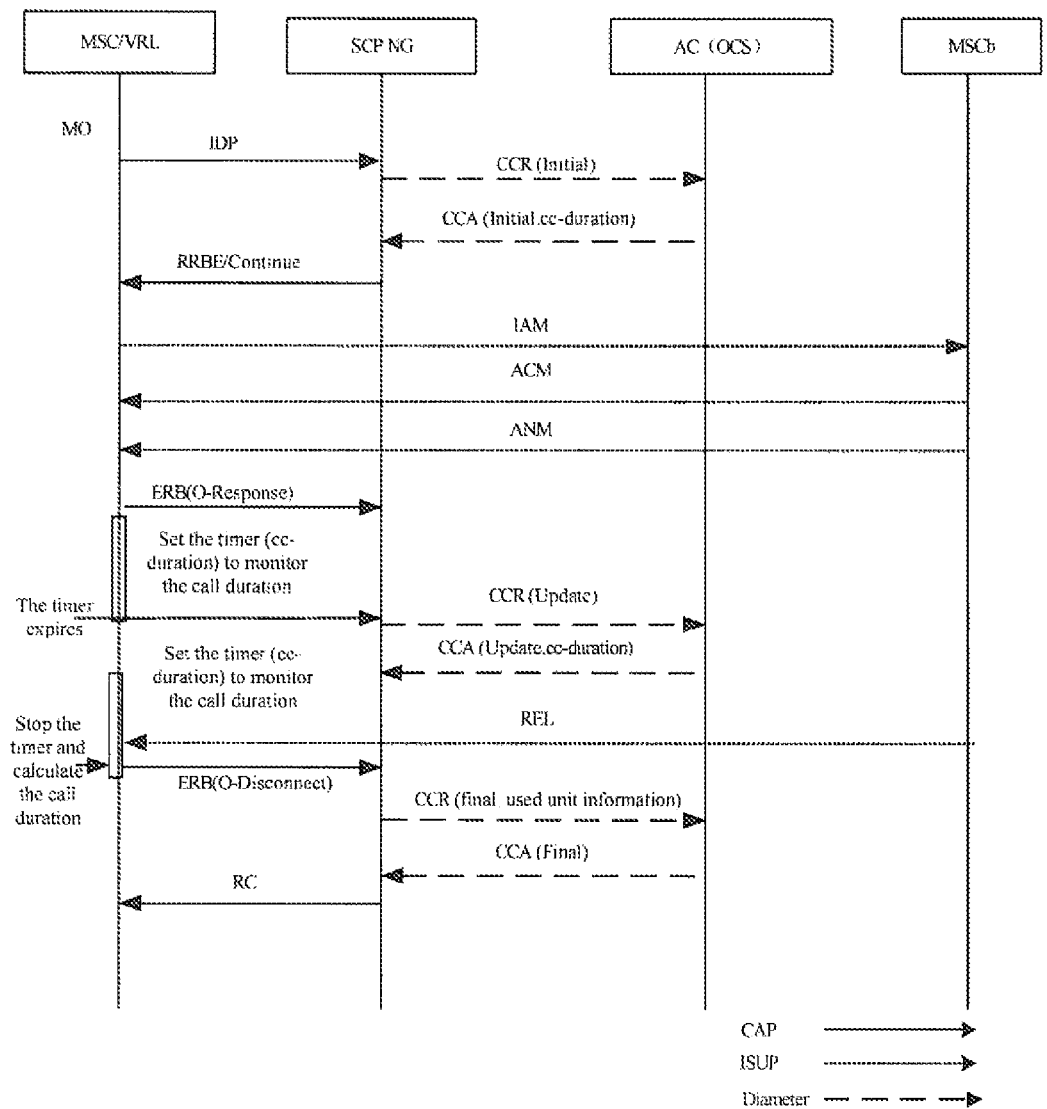
FIG. 2 is a signalling flowchart of a calling PPS of the camel1 network type based on the charge of the OCS according to an embodiment of the present invention.

This embodiment is described by taking an intelligent network OCS framework-based pre-paid call service capable of automatically identifying the network type of the camel as an example. FIG. 1 and FIG. 2 are used for reference in the description, and the description is as follows.

Firstly, a state machine of an SCP identifies, according to a hexadecimal context application value carried in a TC_begin message, a camel phase (e.g. camel2: 04000001003201; camel3: 04000001150304 etc.), then extends the IDP parameter of camel1 and camel2, and extends a dummy field to indicate whether an upper layer service is the IDP of camel1 type or the IDP of camel2 type (camel1 and camel2 share one IDP); and the Service IDP of camel3 still use the IDP of camel3 and the camel phase is identified by the upper applications through different event numbers.

The SCP should be able to accurately trigger the intelligent network services. The service of camel3 of the embodiment of the present invention is triggered for network applications of no matter camel1, or camel2, or camel3. The service key can be configured and the consistency of relevant signalling in a session should be verified.

The SCE needs to be rebuilt. Based on the camel3 version, the extended parameter of the IDP message is supported, all CAP operation libraries of camel2 and camel1 need to be loaded to the SCE version of camel3 so that the service can be operated using signalling of camel1, camel2 and camel3. The SCE also needs to transplant the whole set of algorithms of camel1 and camel2 to the camel3 version to support calculations of parameter structures of different camel types.

In the part of the development of the upper layer applications, the service determines whether the IDP is the IDP of camel3 according to the event number, if the IDP is the IDP of camel1/2, determines whether the IDP is the IDP of camel1 or the IDP of camel2 according to the extended parameter dummy of the IDP of camel2.

After identifying the corresponding network type of the camel according to the event number and the extended parameter of the IDP, the service performs signalling processing of the corresponding network type. First, the service processes structures of different parameter types, and then processes special parameters of the network structure of this type; finally, the signalling should be kept consistent during the whole call process. For the network types of camel2 and camel3, the signalling operation parameters are different, but the signalling process is basically the same. For example, when the identified network type of the camel in which the current call is located is camel2 or camel3, the IDP parameters are processed using algorithms corresponding to camel2 or camel3, and charging information obtained by the processing is sent to the OCS by a Credit Control Request (CCR) to request charging authentication. The RRBE of the camel2 type or the camel3 type, the AC and the continue signalling are delivered according to the received credit control request, and the SCP times the call of the user.

The processing of the service is very different for the camel1 application. When the network type of the camel in which the current call is located is identified as camel1, the IDP parameters are processed using algorithms corresponding to camel1 and the charging information obtained by the processing is sent to the OCS by a CCR to request charging authentication. The RRBE of the camel1 type and the continue signaling are delivered according to the received CCR. The SCP sets a timer and times the call of the user. The registration event of camel1 only supports registration response and hang-off event. For some camel versions, there may be no mscAddress and calledPartyBCDNumber in the IDP and sound reproduction in camel2/3 is not supported in camel1, thus sound reproduction and number receiving should be skipped. The AC and ACR operations are not defined in the camel1 application, thus the SCP needs to automatically set the timer according to the applied and obtained duration quota. The first timer is started after a call is responded. After the timer expires, the subsequent application operation CCR (update) is sent to apply for a subsequent tinier, continue monitoring the call, cancel the timer which is still running as soon as the call is hung off, at the same time, automatically calculate the duration of the whole call according to the response time and the hang-off time, and send the call duration to the OCS to charge. In addition, since there are no time zone parameters in the IDP, time zone information is not carried when the CCR (initial) message is sent.

Preferably, the charging information above comprises one or more of the followings: a calling number, a called number, an msc address, a location number and a call reference.

An example of a call process of camel2/3 is described as below according to FIG. 1. What needs to be explained is that, solid lines represent the CAP; the dashed lines formed by short lines represent Diameter and the dashed lines formed by dots represent ISUP in FIG. 1.

A user initiates a call, a Mobile Switch Centre (MSC) triggers a pre-paid call service according to the O_CSI/T_CSI, and an SCP identifies the call as a camel2 call or a camel3 call according to the application context of the camel, and if the call is a camel2 call, fills in the extended parameter dummy of the IDP to be identified by the upper layer applications.

After receiving the IDP information, the service identifies the call as a camel2 call or a camel3 call according to the event number and the extended parameter of the IDP, then performs the corresponding parameter processing using appropriate algorithms, and performs number regulation etc. and sends relevant information to the OCS by the CCR (initial) to request charging authentication.

After receiving the CCR (initial), the SCP delivers AC, CONTINUE signalling and RRBE of the corresponding network type, wherein the duration of the AC is a credit unit allocated by the OCS.

The MSC performs paging, and the user responds and reports a response event.

After the quota of the user is used up, the MSC reports an ACR event.

The SCP sends a CCR (update) message to the OCS to apply for quota over again and reports the used duration.

The OCS, according to the reported CCR, performs inverse calculation and reservation, and sends the available duration to the SCP by a Credit Control Answer (CCA), wherein according to the actual call situation of the user, the CCR (update) operation may be repeated.

The user hangs off, and the MSC reports a user hang-off event to the SCP and reports an ACR event at the same time.

The SCP sends a CCR (final) request to the OCS according to the duration reported by the ACR. After receiving the CCR (final), the OCS completes fee deduction of the user.

The service releases call resources after issuing a telephone bill.

An example of a call process of camel1 is described as below according to FIG. 2.

A user initiates a call, an MSC triggers a pre-paid call service according to the O_CSI/T_CSI, and an SCP identifies the call as a camel1 call according to the application context of the camel, and if the call is a camel1 call, fills in the extended parameter dummy of the IDP to be identified by the upper layer applications.

After receiving the IDP information, the service identifies the call as a camel1 call according to the event number and the extended parameter of the IDP, then performs the corresponding parameter processing using appropriate algorithms, and performs number regulation etc. and sends relevant information to the OCS by the CCR (initial) to request charging authentication.

After receiving the CCR (initial), the SCP delivers CONTINUE signalling and RRBE (only the registration response and the hang-off event) of the camel1 type.

The MSC performs paging, and the user responds and reports a response event.

After receiving the response event, the SCP begins to set a timer, wherein the duration of the timer is a credit unit allocated by the OCS.

After the timer expires, calculate the call duration from response to the current moment and send a CCR (update) to the OCS to apply for quota over again, wherein the CCR (update) comprises the accumulated duration of the ongoing call.

The OCS, according to the reported CCR, performs inverse calculation and reservation, and sends the available duration to the SCP by a CCA.

According to the actual call situation of the user, SCP may set the timer repeatedly; the SCP may also send the CCR (update) to the OCS, report the accumulated duration to the OCS and apply for the quota from the OCS repeatedly.

The user hangs off, and the MSC reports a user hang-oft event to the SCP.

The SCP cancels the timer first, then calculates the accumulated call duration from response to hang-off of the user, and sends a CCR (final) request to the OCS. After receiving the CCR (final), the OCS completes fee deduction of the user.

The service releases call resources after issuing a telephone bill.

Through this embodiment, a method for realizing a voice call service which is automatically adaptive to network types is provided, thus largely facilitating the operators to develop voice services, and saving development and investment costs, and it is beneficial for the suppliers to popularize voice services.

Embodiment 4

Figure 3:
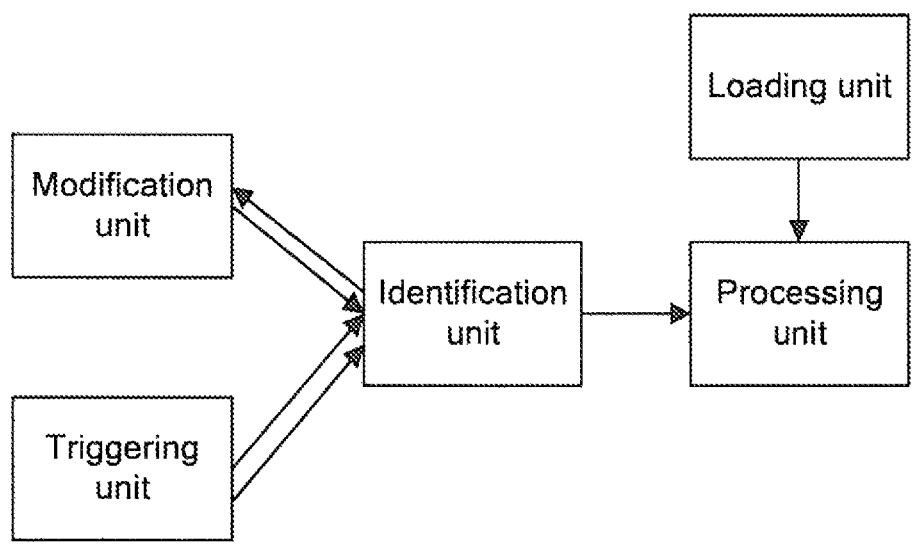
FIG. 3 is a schematic diagram illustrating an apparatus according to an embodiment of the present invention.

This embodiment combines the embodiments above and the solutions of their preferable embodiments, and this embodiment provides an apparatus for processing a voice call which is automatically adaptive to network types of the camel. As shown in FIG. 3, the apparatus comprises: a loading unit, configured to load, based on a camel3, CAP operation libraries and algorithms of a camel1 and a camel2 to an SCE version of the camel3; a modification unit, configured to identify a network type of camel according to an application context of the camel, and determine whether to modify IDP parameters according to the identified network type; a triggering unit, configured to trigger a service of a camel3 network type, an identification unit, configured for the service to identify a network type of camel, in which a current call is located, based on an event number and IDP parameters; and a processing unit, configured to invoke, according to the identified network type of the camel in which the current call is located, a CAP operation library and an algorithm of a corresponding camel to process parameter information in an IDP, and invoke a signalling of a corresponding network type in subsequent operations.

Preferably, the application context of the camel is obtained from the first message of a call of a user.

When the modification unit identifies the network type of the camel according to the application context of the camel, and modifies the IDP parameters according to the identified network type or does not modify the IDP parameters according to the identified network type, it comprises: when the network type of the camel is identified as a camel1 network type or a camel2 network type according to the application context of the camel, the modification unit modifies the IDP parameters and the extended parameter dummy of the IDP; when the network type of the camel is identified as a camel3 network type, the modification unit does not make modifications.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The above are only preferable embodiments of the present invention and not intended to limit the present invention, and for those skilled in the art, there may be various modifications and changes. Any modifications, equivalent replacements, improvements and the like within the spirit and principle of the present invention shall fall within the scope of protection of the present invention.

What is claimed is:

1. A method for processing a voice call, comprising the steps of:
    based on a Customized Applications for Mobile Network Enhanced Logic (camel) phase3 (camel3), loading camel Application Part (CAP) operation libraries and algorithms of a camel phase1 (camel1) and a camel phase2 (camel2) to a service creation environment (SCE) version of the camel3;
    identifying a network type of camel according to an application context of the camel, and determining whether to modify Initial Detection Point (IDP) parameters according to the identified network type, wherein in the steps of identifying the network type of the camel according to the application context of the camel, and determining whether to modify the IDP parameters according to the identified network type, the following steps are comprised: when the network type of the camel is identified as a camel1 network type or a camel2 network type according to the application context of the camel, modifying the IDP parameters; and when the network type of the camel is identified as the camel3 network type according to the application context of the camel, making no modifications;
    triggering a service of a camel3 network type;
    the service identifying a network type of camel, in which a current call is located, based on an event number and IDP parameters; and
    invoking, according to the identified network type of the camel in which the current call is located, a CAP operation library and an algorithm of a corresponding camel to process parameter information in an IDP, and invoking a signalling of a corresponding network type in subsequent operations.

2. The method according to claim 1, wherein the application context of the camel is obtained from the first message of a call of a user.

3. The method according to claim 1, wherein the modified IDP parameters are used for indicating an upper layer service as an IDP of a camel1 type or an IDP of a camel2 type.

4. The method according to claim 3, wherein a dummy field is extended, wherein the extended dummy field is used for indicating the upper layer service as the IDP of the camel1 type or the IDP of the camel2 type.

5. The method according to claim 1, wherein in the steps of invoking, according to the identified network type of the camel in which the current call is located, the CAP operation library and the algorithm of the corresponding camel to process parameter information in the IDP, and invoking the signalling of the corresponding network type in subsequent operations,
    when the network type of the camel, in which the current call is located, is identified as camel1, the following steps are comprised:
    using an algorithm corresponding to camel1 to process IDP parameters, and sending charging information, obtained by the processing, to an Online Charging System (OCS) through a Credit Control Request (CCR) to request charging authentication;
    delivering a Request Report Basic Call State Model (BCSM) Event (RRBE) of a camel1 type according to the received CCR and delivering a continue signalling;
    a Service Control Point (SCP) setting a timer and timing a call of a user;
    when the network type of the camel, in which the current call is located, is identified as camel2 or camel3, the following steps are comprised:
    using an algorithm corresponding to camel2 or camel3 to process IDP parameters, and sending charging information, obtained by the processing, to an OCS through a CCR to request charging authentication;
    delivering a RRBE of a camel2 or camel3 type and an Application Charging (AC) according to the received CCR and delivering a continue signalling;
    an SCP timing a call of a user.

6. The method according to claim 5, wherein the charging information comprises at least one of the followings: a calling number, a called number, an msc address, a location number and a call reference.

7. The method according to claim 5, wherein when the network type of the camel, in which the current call is located, is identified as camel 1, the step of the SCP setting the timer and timing the call of the user comprises the steps of:

setting the timer, wherein duration of the timer is a credit unit allocated by the OCS;

after the timer expires, applying for quota over again from the OCS;

the OCS allocating available duration for the user; and the call of the user ending and timing of the user being completed.

8. The method according to claim 5, wherein when the network type of the camel, in which the current call is located, is identified as camel2 or camel3, the step of the SCP timing the call of the user comprises the steps of:

after duration of the AC is used up, applying for quota over again from the OCS;

the OCS allocating available duration for the user; and the call of the user ending and timing of the user being completed.

9. An apparatus for processing a voice call, comprising a hardware processor configured to execute the following program units:

a loading unit, configured to load, based on a Customized Applications for Mobile Network Enhanced Logic (camel) phase3 (camel3), camel Application Part (CAP) operation libraries and algorithms of a camel phase1 (camel1) and a camel phase2 (camel2) to a service creation environment (SCE) version of the camel3;

a modification unit, configured to identify a network type of camel according to an application context of the camel, and determine whether to modify Initial Detection Point (IDP) parameters according to the identified network type, wherein when the network type of the camel is identified as a camel1 network type or a camel2 network type according to the application context of the camel, the modification unit modifies the IDP parameters; and when the network type of the camel is identified as a camel3 network type according to the application context of the camel, the modification unit makes no modifications;

a triggering unit, configured to trigger a service of a camel3 network type;

an identification unit, configured for the service to identify a network type of camel, in which a current call is located, based on an event number and IDP parameters; and a processing unit, configured to invoke, according to the identified network type of the camel in which the current call is located, a CAP operation library and an algorithm of a corresponding camel to process parameter information in an IDP, and invoke a signalling of a corresponding network type in subsequent operations.

10. The apparatus according to claim 9, wherein the application context of the camel is obtained from the first message of a call of a user.

11. The apparatus according to claim 9, wherein the modified IDP parameters are used for indicating an upper layer service as an IDP of a camel1 type or an IDP of a camel2 type.

* * * * *